(12) United States Patent
Heer (10) Patent No.: US 6,328,006 B1
(45) Date of Patent: Dec. 11, 2001

(54) DEVICE FOR ADJUSTING THE PHASE ANGLE OF A CAMSHAFT OF AN INTERNAL COMBUSTION ENGINE

(75) Inventor: Siegfried Heer, Kirchdorf/Krems (AT)

(73) Assignee: TCG Unitech Aktiengesellschaft, Kirchdorf/Krems (AT)

( * ) Notice: Subject to any disclaimer, the term of this patent is extended or adjusted under 35 U.S.C. 154(b) by 0 days.

(21) Appl. No.: 09/533,168

(22) Filed: Mar. 22, 2000

(30) Foreign Application Priority Data

Mar. 23, 1999 (AU) .................................................. 539/99
May 12, 1999 (AU) .................................................. 854/99

(51) Int. Cl.$^7$ .................................................. F01L 1/34
(52) U.S. Cl. .................................. 123/90.15; 123/90.17; 123/90.18; 123/90.11
(58) Field of Search ........................... 123/90.15, 90.16, 123/90.17, 90.18, 90.11, 90.12; 251/129.11; 74/568 R; 464/2

(56) References Cited

U.S. PATENT DOCUMENTS

| 3,978,829 | * | 9/1976 | Takahashi et al. | 123/90.15 |
| 4,770,060 | | 9/1988 | Elrod et al. . | |
| 4,771,742 | * | 9/1988 | Nelson et al. | 123/90.17 |
| 4,878,461 | * | 11/1989 | Sapienza, IV et al. | 123/90.15 |
| 4,917,058 | * | 4/1990 | Nelson et al. | 123/90.17 |
| 5,329,890 | | 7/1994 | Mueller . | |
| 5,417,186 | | 5/1995 | Elrod et al. . | |
| 5,924,395 | * | 7/1999 | Moriya et al. | 123/90.15 |
| 5,979,382 | * | 11/1999 | Heer | 123/90.17 |
| 6,138,622 | * | 10/2000 | Heer | 123/90.17 |
| 6,138,623 | * | 10/2000 | Heer | 123/90.17 |
| 6,199,522 | * | 3/2001 | Regueiro | 123/90.15 |
| 6,216,654 | * | 4/2001 | Regueiro | 123/90.15 |

FOREIGN PATENT DOCUMENTS

| 3320835 | 12/1984 | (DE) . |
| 3929619 | 3/1991 | (DE) . |
| 4101676 | 7/1992 | (DE) . |
| 4110088 | 7/1992 | (DE) . |
| 4406983 | 3/1995 | (DE) . |
| 0254058 | 1/1988 | (EP) . |
| 0596860 | 5/1995 | (EP) . |
| 0903471 | 3/1999 | (EP) . |
| 2221513 | 2/1990 | (GB) . |

\* cited by examiner

*Primary Examiner*—Teresa Walberg
*Assistant Examiner*—Fadi H. Dahbour
(74) *Attorney, Agent, or Firm*—Dykema Gossett PLLC (57) ABSTRACT

A device for adjusting the phase angle of a camshaft of an internal combustion engine includes a drive gear for driving a camshaft accommodated in a coaxial arrangement relative to the camshaft and an electric motor communicating with the camshaft via a Harmonic Drive having a roller bearing with an elliptical inner ring, an externally toothed, flexible gear arranged on the roller bearing, and a rigid, internally toothed gear engaging the externally toothed gear. A simple structure is achieved by providing the electric motor with a housing which is rigidly connected to the camshaft via retaining elements which extend through recesses in the drive gear so that the recesses restrict the allowable adjusting range of the camshaft.

9 Claims, 5 Drawing Sheets

DEVICE FOR ADJUSTING THE PHASE ANGLE OF A CAMSHAFT OF AN INTERNAL COMBUSTION ENGINE

BACKGROUND OF THE INVENTION

The invention relates to a device for adjusting the phase angle of a camshaft of an internal combustion engine with a drive gear for driving a camshaft accommodated in a coaxial arrangement relative to the camshaft, and with an electric motor communicating with the camshaft via a Harmonic Drive gear having a roller bearing with an elliptical inner ring, an externally toothed, flexible gear arranged on said roller bearing and a rigid, internally toothed gear engaging the externally toothed gear.

To obtain optimum values for fuel consumption and exhaust emissions in different areas of the internal combustion engine's operating characteristics, the valve timing must be varied depending on different operating parameters. An elegant manner of varying the valve timing is realized by rotating the camshaft relative to its driving gear. The camshaft of an internal combustion engine is usually driven by a sprocket wheel, which is connected to the crankshaft via a drive chain, or by a drive gear configured as a pulley, which is connected to the crankshaft via a toothed belt.

DESCRIPTION OF THE PRIOR ART

In GB 2 221 513 A a camshaft adjusting mechanism is described wherein an electric motor operates a set of link arms turning the camshaft relative to its driving gear. To this purpose an actuating element carrying the pivoted arms is shifted in axial direction. This solution however involves considerable expense and play on account of the large number of bearings.

In DE 41 10 088 C1 and DE 39 29 619 A1 adjusting mechanisms are described wherein an adjusting element is provided between a member connected to the camshaft and a member connected to the drive gear, which element has two helical threads meshing with corresponding threads of the camshaft or the drive gear. By axially displacing this adjusting element, the camshaft can be rotated relative to its drive gear. Axial displacement of the adjusting element may be obtained by actuating a hydraulic plunger which is operated in dependence of the desired adjustment. The disadvantage of this solution is that the forces required can only be attained with a large hydraulic plunger necessitating considerable constructional expense. Moreover, a comparatively large quantity of oil is required for operating the plunger, which will necessitate a suitably sized pump and thus add to the engine load. As a further drawback of this known type of mechanism, adjustment of the camshaft is possible only between two extreme positions.

Electric adjusting devices also are presented in DE 41 01 676 A1 and in DE 44 06 983 C, wherein an electric motor is provided for displacing the adjusting element by means of a threaded spindle. As the adjusting element rotates essentially at camshaft speed, an axial thrust bearing must be provided between the electric motor and the adjusting element, which takes up the relative movement between the non rotating and the rotating member. In the above solution, the thrust bearing is more or less permanently subject to load throughout the entire operating period, since the torsional moments acting between drive gear and camshaft will produce a force acting on the adjusting element in axial direction. For this reason the thrust bearing is a critical component which will limit the useful life of the engine. A similar solution is disclosed in DE 33 20 835 A1, wherein the same disadvantages are encountered.

In DE 36 07 256 A a mechanism is described wherein a stepping motor is provided for adjusting the camshaft, the stepping motor being connected to both camshaft and drive gear. As the stepping motor must take up the entire driving torque for the camshaft, such a solution cannot be achieved within reasonable limits of expense.

EP 0 596 860 A discloses a device for adjusting the valve opening times in which the camshaft has a hollow configuration and comprises an inner shaft. The cams are bipartite, wherein each single cam section can be turned relative to the other by a determined angle. The rotation of the two cam sections is executed by a revolving electric motor, which is supplied via slip rings. Similar solutions are disclosed in U.S. Pat. Nos. 5,417,186 and 4,770,060.

A former suggestion of the applicant, published in EP-A 0 903 471, presents an adjusting mechanism for the phase angle of a camshaft with a planetary gear set, in which the adjustment is executed by an electric motor that is supplied with current by means of slip contacts.

In most of the solutions described above, the electromotive adjustment is made via a set of gears with a big gear reduction ratio in order to maintain the torque on the engine in an acceptable range. To transmit the force via an axially slidable element with screw-shaped teeth has the advantage that very big gear reduction ratios may obtained quite easily. The disadvantage of these solutions however is that the friction is quite high and that accordingly high forces originate in axial direction which have to be absorbed by the bearings. On the other side, the transmission of force via a planetary gear set is quite complicated and it is difficult to achieve big gear reduction ratios.

By using a so-called Harmonic Drive, a big gear reduction ratio may be obtained easily. If for example the number of teeth of the externally toothed gear is smaller by two than the number of teeth of the internally toothed gear which amount to for example 50, a step-up ratio of about 1:25 is achieved.

In the concrete embodiment of a device of the type mentioned above however and on top of the already described questions, the following groups of problems have to be overcome in construction: the bearing of the electric motor has to be as simple as possible, so that the Harmonic Drive is not submitted to inadmissible big loads. Furthermore, the bearing of the electric motor is not allowed to hinder the necessary sealing between the oil guiding sections (camshaft and set of gears) and those sections that do not guide oil. It also is necessary that the bearing of the drive gear be realized in the simplest possible way.

Another constructional aim to be achieved is to guarantee an emergency operation of the motor in case of failure of the adjusting device and generally, to restrict the adjusting range to allowable angles.

SUMMARY OF THE INVENTION

It is an object of the present invention to develop a device as described above in such a manner that the above mentioned requirements may be met with as little expenditure as possible.

According to the invention, the electric motor is provided with a housing rigidly connected to the camshaft via retaining elements which are guided in the drive gear by recesses in such a manner that the recesses delimit the allowable adjusting range of the camshaft. Thanks to the solution according to the invention, the electric motor itself does not need any bearing since it is over-mounted on the camshaft. Excessive load on the Harmonic Drive can thus reliably be prevented, since a relative movement between the different component parts of the Harmonic Drive caused by osillations or the like is virtually excluded. Moreover, there is one simple possibility to bear the drive gear. The size of the recesses automatically defines the adjusting range of the camshaft relative to the drive gear. That's why it is possible to restrict this adjusting range to allowable values. This measure also assures a defined position of the camshaft in case of failure of the adjusting device or in case of cold start. Actually, the Harmonic Drive is self-locking due to the big gear reduction ratio, but, due to the ineluctable rotational oscillations in the system, a position of the camshaft corresponding to the latest possible valve opening time is almost possible to tune the electronics of the motor in such a way that, under these conditions, acceptable emergency operation is possible.

It is particularly preferable when the electric motor is provided with a shaft that is directly connected to the elliptical inner ring of the roller bearing. It provides benefits to have the flexible gear of the Harmonic Drive directly connected to the camshaft. In this case, the internally toothed gear of the Harmonic Drive is connected to the drive gear. In this way, a particularly simple structure of the solution according to the invention may be brought forth.

The disadvantage of the Harmonic Drives of the art is that they only can be loaded to a limited extent because of their relatively fine teeth. Such gears are particularly sensitive to impulsive loads. In order to avoid this disadvantage, the gear may be made of the following component parts: a first engagement section arranged on the inner periphery of a first engaging part, a second engagement section arranged on the outer periphery of a flexible engaging part and engaging the first engagement section and a driving member arranged coaxially to the first engaging part and to the flexible engaging part, a roller bearing provided with a non circular inner ring being accommodated on said driving member and having a flexible outer ring connected to the flexible engaging part and pushing it at preferably two points against the first engaging part, wherein the first engagement section of the first engaging part frictionally engages the second engagement section of the flexible engaging part.

In such a gear, the evident allocation of the different component parts with regard to the phases and the exact transmission ratio of a toothed gearing is no longer given, but resistance to overload may thus be achieved, which is not possible with a toothed gearing. Furthermore, the gear according to the invention is unaffected by dirt and requires little lubrication.

A further advantage of the invention is that the eccentricity of the wave generator may be considerably smaller than in a toothed gearing of the art. In those conventional toothed gearings, it is necessary to make the eccentricity so big that the teeth of the first and of the second engagement section do not touch each other outside the engaging areas. In the solution according to the invention, the eccentricity is only defined by the small path needed to establish a frictional engagement. That is why the deformation of the flexible engaging part during operation is considerably smaller, which reduces losses and increases service life.

In principle it is possible to have the first and the second engagement section meshing at one, two, three or more points. It proved particularly advantageous however to provide two diametrically opposite meshing points. In such a solution, the inner ring of the roller bearing is essentially elliptical in cross section.

Secure transmission of force may particularly be achieved by giving the first engagement section a conical shape with a small aperture angle. Eventual wear can thus be compensated, too. In this connection, it is particularly advantageous to have the aperture angle amounting to between 1° and 10°, preferably between 2° and 6°. In this case, the wave generator preferably is embodied in such a manner that the outer ring of the roller bearing has got a conical shape with a small aperture angle. The aperture angle of the outer ring should thereby essentially match the aperture angle of the first engagement section.

It is particularly advantageous to provide a pressure means that presses the first engagement section in axial direction against the second engagement section. An independent adjustment of the pressure force and with it of the transmissible torque may thus be achieved. The pressure means preferably is provided with a spring that prestresses the first engaging part and the flexible engaging part against each other in axial direction.

A particularly favorable constructional solution is achieved by having the retaining elements configured as bolts that are guided through oblong holes in the form of circular arcs provided in the drive gear. A particularly advantageous lateral guiding of the drive gear is achieved when the drive gear is by one side adjacent to a shoulder of the camshaft and by the other side to shoulders of sleeves being pressed against the camshaft by the bolts. Current supply is possible in a particularly advantageous way by having the electric motor supplied with current via concentrically arranged slip rings.

The present invention will be described more explicitly in the following with the help of the embodiment illustrated in the figures.

DETAILED DESCRIPTION OF THE PREFERRED EMBODIMENTS

Figure 1:
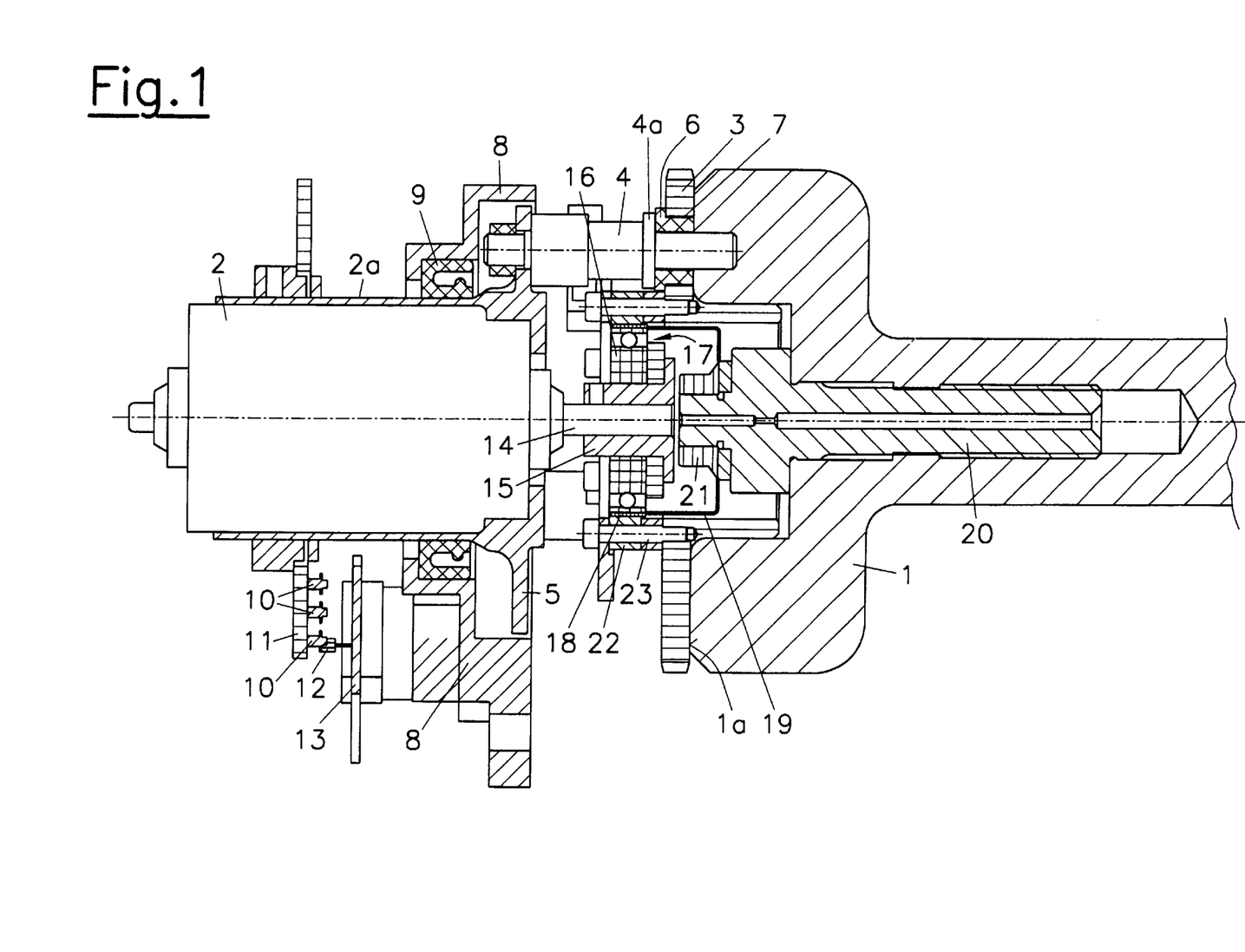
FIG. 1 is a section through a first variant of the invention.

In FIG. 1 a camshaft 1 is partially represented. A drive gear 3, which is configured as a sprocket wheel, serves in a actually well-known manner to drive the camshaft 1 via a chain drive (not shown) which communicates with the crankshaft of the associated internal combustion engine (not illustrated).

An electric motor 2 with a housing 2a serves to adjust the camshaft 1 relative to the drive gear 3, so that the valve opening times of the internal combustion engine may be varied.

on the front side of the camshaft 1, bolts 4 are screwed in at regular angle intervals. When using for example three bolts 4, the angle intervals amount to 120° each. The bolts 4 are rigidly connected to a flange 5 by their end, the flange being configured intergral with the housing 2a of the electric motor 2. The electric motor 2 is thus supported directly by the camshaft 1 without the help of any additional bearing. A sleeve 6 is mounted between the shoulder of the front surface 1a of the camshaft 1 and a collar 4a of the bolts 4a, the sleeve being guided through an oblong hole 7 in the form of circular arcs provided in the drive gear 3. In this way, the drive gear 3 is guided laterally with minimal clearance but is nevertheless capable of rotating relative to the camshaft 1.

The allowable angle of rotation ranges between approximately 20° and 30° and comes up to the allowable adjusting angle of the camshaft 1. being guided through an oblong hole 7 in the form of circular arcs provided in the drive gear 3. In this way, the drive gear 3 is guided laterally with minimal clearance but is nevertheless capable of rotating relative to the camshaft 1. The allowable angle of rotation ranges between approximately 20° and 30° and comes up to the allowable adjusting angle of the camshaft 1.

The housing 2a of the electric motor 2 is sealed against a stationary housing 8 of the adjusting device of the camshaft by a seal 9 that is configured as a shaft seal for example. The electric motor 2 is supplied with current via slip rings 10 arranged on a disk 11 rotating together with the electric motor 2. Current supply occurs via slip contacts 12, only one of them being illustrated for more simplicity. The slip contacts 12 are arranged on a stationary support 13.

The shaft 14 of the electric motor 2 is rigidly connected to the elliptically configured inner ring 16 of a roller bearing 17 via a sleeve 15. In the literature, this part of a Harmonic Drive is mostly called a wave generator. The outer ring 18 of the roller bearing 17 is connected to a flexible, externally toothed gear 19 that is configured as a whole like a pot and that communicates with the camshaft. Considered in detail, a screw 20 is screwed in the camshaft 1 and the gear 19 is gripped in a non positive way between the screw's 20 head and a nut 21. The external thread of the gear 19 meshes with a rigid, internally toothed gear 22 at two points, namely at the apexes of the ellipse formed by the wave generator. The externally toothed gear is rigidly connected to the drive gear 3 via screws 23.

Operation of the device of the present invention will be described in the following. When the electric motor 2 is not energized, the camshaft 1 is not adjusted relative to the drive gear 3. But when the shaft 14 of the electric motor completes one revolution, the rotation of the wave generator causes all the teeth of the flexible gear 18 to engage successively the internally toothed gear 22 has fifth teeth, a relative motion of these two gears takes place to the extent of two teeth, i.e. of the one twenty-fifth revolution. This also corresponds to the angle of rotation by which the camshaft 1 rotates relative to the drive gear 3. Thanks to the big gear reduction ration, the torque that has to be produced by the electric motor 2 is quite small. In the structure according to the invention, the bearing of the drive gear 3 is very simple, and thanks to the geometry of the oblong holes 7, the allowable adjusting angle of the camshaft 1 may be restricted very easily.

Figure 2:
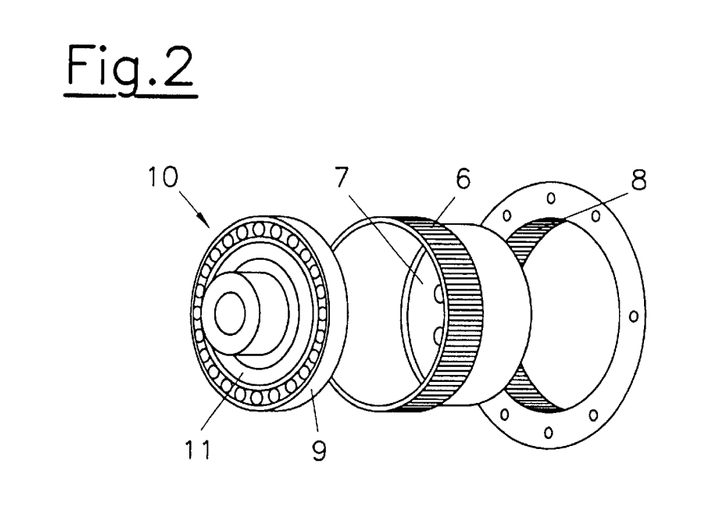
FIG. 2 is an exploded view of a common Harmonic Drive.

FIG. 2 shows details of a Harmonic Drive in an axonometric exploded view. The inner ring 11 of the roller bearing 10 is elliptic with a slight eccentricity. The outer ring 9 is directly supported by the inner side of a flexible gear 6. This gear 6 meshes at two diametrically opposite points with a rigid, internally toothed gear 8, which has got a circular shape.

Figure 3A:
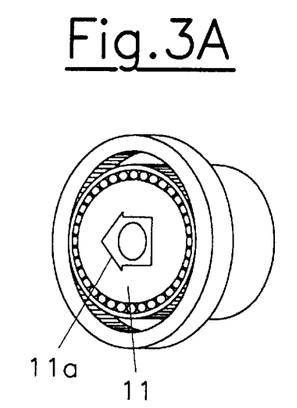
FIGS. 3A, B, C are representations intended to explain the way a Harmonic Drive operates.
Figure 3B:
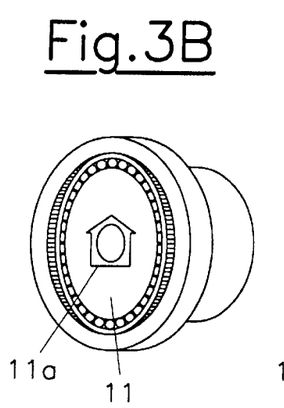
Figure 3C:
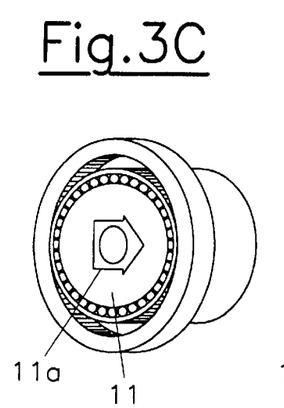
Figure 3D:
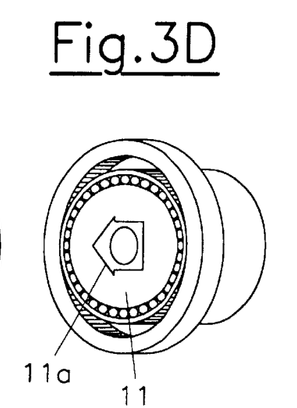

FIGS. 3A, B, C and D show the mode of operation of this Harmonic Drive. In the position shown in FIG. 3B, the inner ring 11 is rotated 90° clockwise relative to the position shown in FIG. 3A. The FIG. 3C shows a further rotation by 90° and FIG. 3D one complete revolution by 360°. For the sake of clarity, an arrow 11a was introduced into the FIGS. 3A, B, C and D. The number of teeth of the flexible gear 6 is smaller by two than the number of teeth of the internally toothed gear 8. A small difference in angular velocity between gear 6 and gear 8 arises out of it. As may be seen in the Figures, the sign 6a that alludes to the gear 6 is moved slowly counterclockwise while the inner ring 11 is turning.

As a whole, the rotating angle corresponds to the central angle of two teeth of the gear 6.

Figure 4:
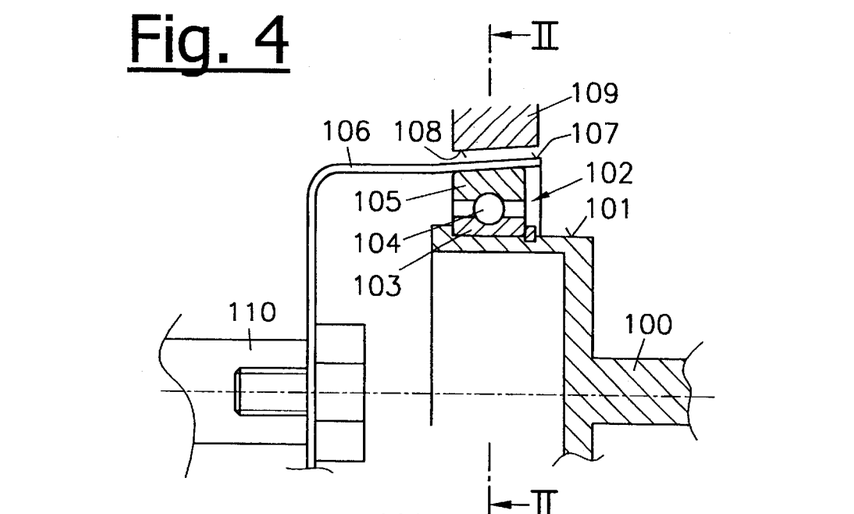
FIGS. 4, 5, 6 and 6A are details of a further variant of the invention.
Figure 5:
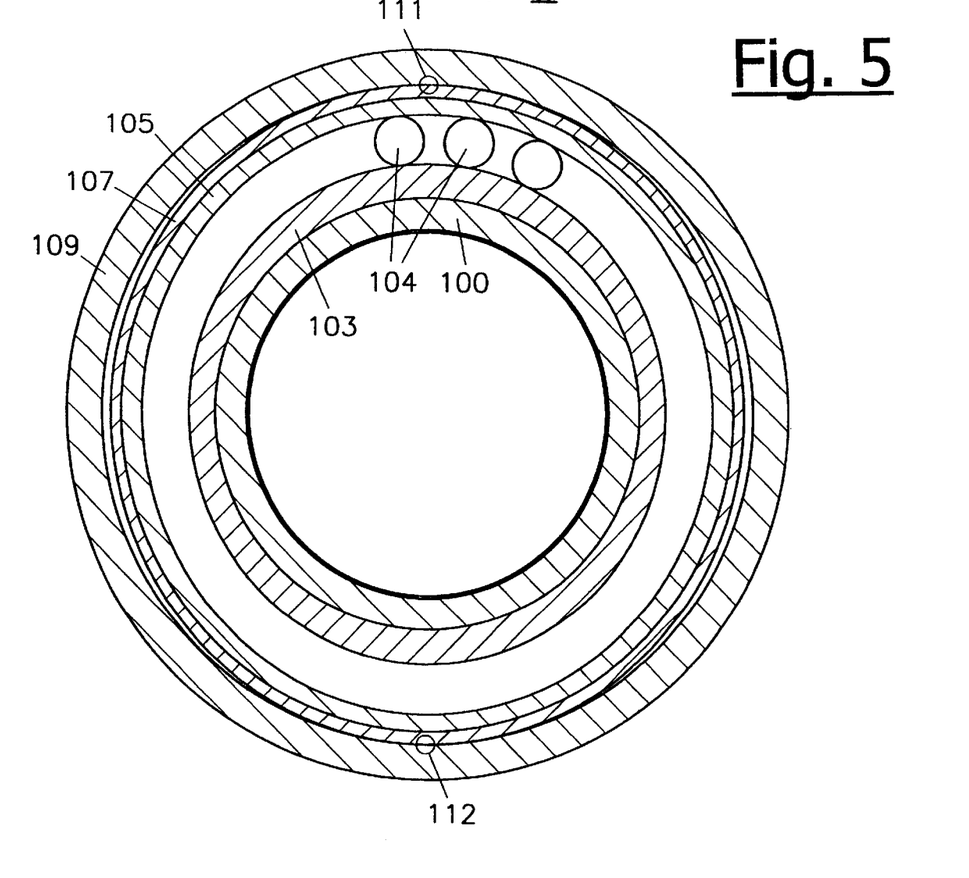

The gear of FIG. 4 consists of a motor shaft 100 provided on its end with a bearing surface 101 on which a roller bearing 102 configured as a ball bearing is wedged up. The roller bearing 102 has an inner ring 103 whose outer periphery is elliptical. The flexible outer ring 105 gets its elliptical shape by the rollers 104. Since the outer periphery of the outer ring 105 is slightly beveled, the ring as a whole adopts the shape of an elliptical cone. A flexible engaging part 106 sits close to the outer ring 105. The second engagement section 107 is arranged on the outer periphery of the engaging part 106, said second engaging part engaging a first engaging part 108 arranged on the inner periphery of a first engaging part 109. The first engagement section 109 has got the shape of a circular cone. An output shaft 110 is communicating with the engaging part 106. A thin-walled inner ring of uniform thickness that is fixed on an elliptical bearing surface may be used instead of an elliptical inner ring 103, so that an elliptical circumferential surface is obtained by resilient deformation.

The way of operation of the device according to the invention is explained more thoroughly in the following. In the position illustrated in FIG. 10, the planes of action 107 and 108 are in contact in the areas 111 and 112, which are opposite one another. When the motor shaft 100 rotates, these areas 111 and 112 creep along the first engagement section 108 until they reach their original position. The second engagement section 107 thereby rolls off on the first engagement section 108. Since the circumference $U_1$ of the first engagement section 108 is slightly bigger than the circumference $U_2$ of the second engagement section 107, the engaging part 106 turns slightly in the opposite direction of rotation from the motor shaft 100. The transmission ratio i, which is defined by the speed of the motor shaft over the speed of the output shaft, corresponds to the reciprocal value of the eccentricity $\epsilon$, when the latter is defined according to the following equation:

$$\epsilon = (U_1 - U_2)/U_1$$

Depending on the material chosen, values of $i=1/\epsilon$ may be achieved in a range of 100 through 300 and more. Generally speaking, the harder the substances used for the planes of action 107 and 108, the bigger the transmission ratio may become.

Figure 6:
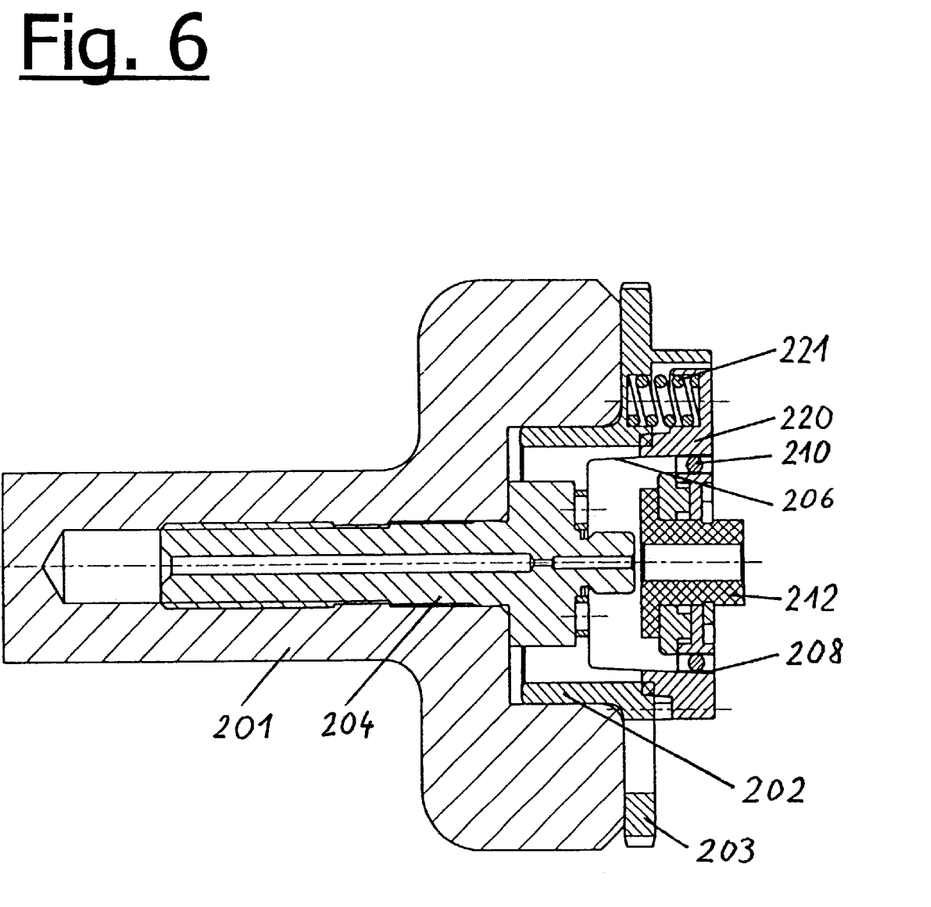

FIG. 6 shows a set of gears according to the invention that is part of an adjusting device for the camshaft of an internal combustion engine, which has not been illustrated in detail. A frictional wheel 206, configured as a thin-walled cylinder and constituting the flexible engaging part, is fixed to the camshaft 201 by means of a screw 204. A sleeve 202 having a sprocket wheel 203 integrated to it is rotatable relative to the camshaft 201. A roller bearing 210 is given an elliptical shape so that the frictional wheel 206 engages an engaging area of the sleeve 202 at only two diametrically opposite points. The circumference of the frictional wheel 206 is slightly smaller than the circumference of the engagement section 208, which is arranged on a ring 220 that may be displaced in axial direction relative to the sleeve 202 and that is configured as a hollow gear. The inner ring of the roller bearing 210 is rigidly connected in a drive element 212 communicating with an adjusting motor (not shown).

To make sure that the required pressure of the frictional wheel 206 acting against the ring 220 is permanent, a spring 221 is provided that prestresses the ring 220 relative to the sleeve 202.

Figure 6A:
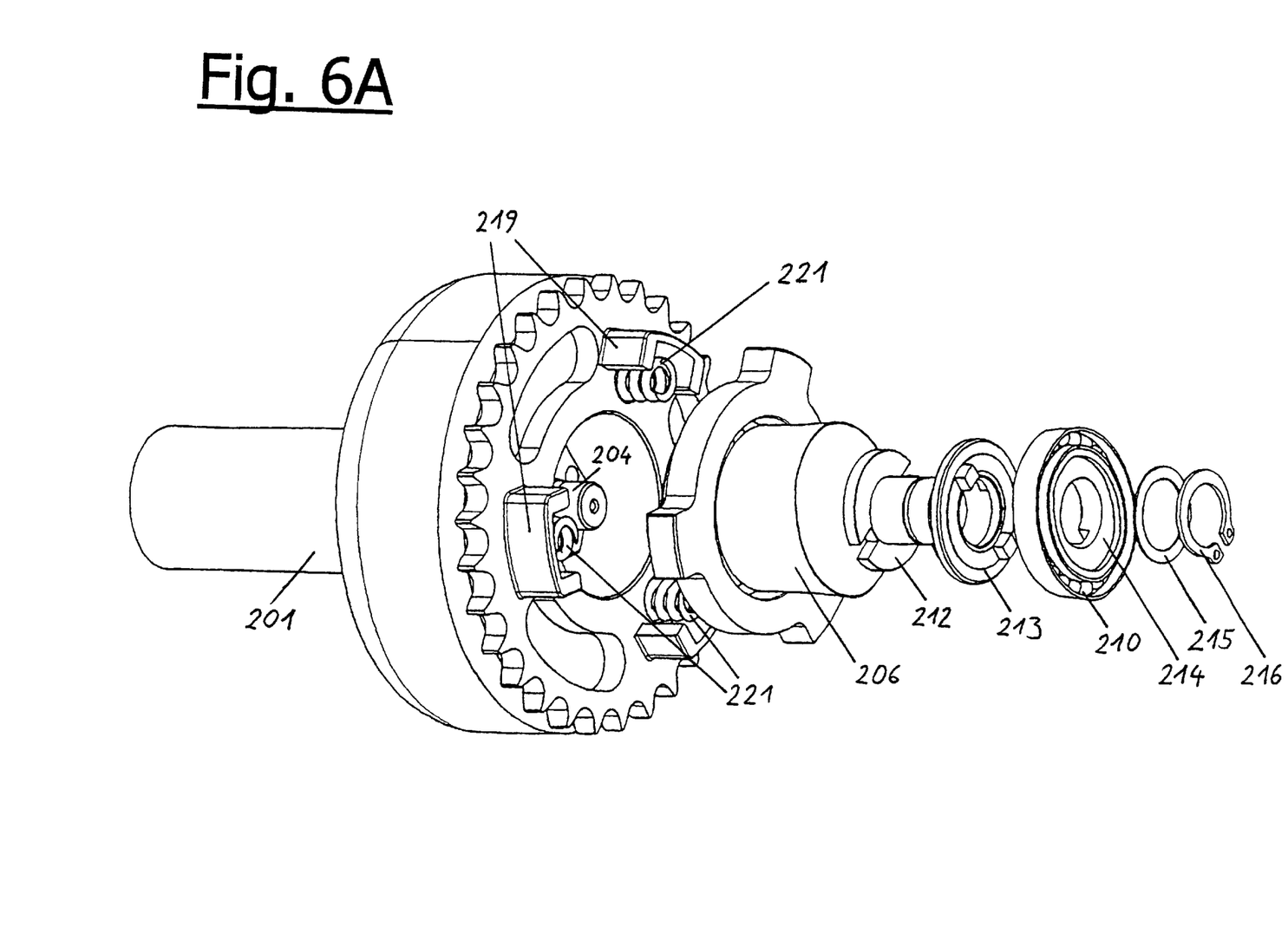

In FIG. 6A, an exploded view shows the structure of the above mentioned set of gears. Although the ring 220 is axially slidable in guides 219 on the sprocket wheel 203, it is non-rotably borne. The drive element 212 is connected to a support 214 for the inner ring of the roller bearing 210 via a ring 213. The connection is secured by a disk 215 and by a Seeger circlip ring 216. The device according to the invention has a very simple structure and meets all the demands made upon an adjusting device for a camshaft.

I claim:

1. A device for adjusting the phase angle of a camshaft of a internal combustion engine comprising:
    a drive gear for driving a camshaft accommodated in a coaxial arrangement relative to the camshaft;
    a Harmonic Drive gear including a roller bearing with an elliptical inner ring, and externally toothed, flexible gear arranged on said roller bearing and directly connected to the camshaft, and a rigid, internally toothed gear engaging the externally toothed gear; and
    an electric motor communicating with the camshaft via said Harmonic Drive gear, the electric motor including a housing which is rigidly recesses in the drive gear so that the recesses restrict the allowable adjusting range of the camshaft.

2. A device according to claim 1, wherein the electric motor includes a shaft that is directly connected to the elliptical inner ring of the roller bearing.

3. A device according to claim 1, wherein the internally toothed gear of the Harmonic Drive is connected to the drive gear.

4. A device according to claim 1, including concentrically arranged slip rings for supplying current to said electric motor.

5. A device for adjusting the phase angle of a camshaft of an internal combustion engine comprising:
    a drive gear for driving a camshaft accommodated in a coaxial arrangement relative to the camshaft;
    a Harmonic Drive gear including a first engagement section arranged on an inner periphery of a first engaging part, a second engagement section arranged on an outer periphery of a flexible engaging part and engaging the first engagement section, and a driving member arranged coaxially to the first engaging part and to the flexible engaging part, a roller bearing provided with a non-circular inner ring being accommodated on said driving member and having a flexible outer ring connected to the flexible engaging part and pushing it by two points against the first engaging part, wherein the first engagement section of the first engaging part frictionally engages the second engagement section of the flexible engaging part; and
    an electric motor communicating with the camshaft via said Harmonic Drive gear, the electric motor including a housing which is rigidly connected to the camshaft via retaining elements, said retaining elements being guided through recesses in the drive gear so that the recesses restrict the allowable adjusting range of the camshaft.

6. A device according to claim 5, wherein the inner ring of the roller bearing is elliptical in cross section.

7. A device according to claim 5, wherein a pressure means preferably configured as a spring is provided that presses the first engagement section against the second engagement section in axial direction.

8. A device for adjusting the phase angle of a camshaft of an internal combustion engine comprising:
    a drive gear for driving a camshaft accommodated in a coaxial arrangement relative to the camshaft;
    a Harmonic Drive gear including a roller bearing with an elliptical inner ring, an externally toothed, flexible gear arranged on said roller bearing and a rigid, internally toothed gear engaging the externally toothed gear; and
    an electric motor communicating with the camshaft via said Harmonic Drive gear, the electric motor including a housing which is rigidly connected to the camshaft via retaining elements, said retaining elements comprising bolts which extend through oblong holes formed as circular arcs in the drive gear so that the circular arcs restrict the allowable adjusting rage of the camshaft.

9. A device according to claim 8, wherein the drive gear is adjacent by one side to a shoulder of the camshaft and by its other side to shoulders of sleeves that are pressed against the camshaft by the bolts.

* * * * *

UNITED STATES PATENT AND TRADEMARK OFFICE
CERTIFICATE OF CORRECTION

PATENT NO. : 6,328,006 B1
DATED : December 11, 2001
INVENTOR(S) : Heer

Page 1 of 1

It is certified that error appears in the above-identified patent and that said Letters Patent is hereby corrected as shown below:

<u>Title page,</u>
Replace Item [30] with:
-- [30] Foreign Application Priority Data

Mar. 23, 1999 (AT)......................................539/99
May 12, 1999 (AT)......................................854/99 --

Signed and Sealed this

Nineteenth Day of March, 2002

Attest:

Attesting Officer

JAMES E. ROGAN
Director of the United States Patent and Trademark Office